United States Patent Office 2,968,648
Patented Jan. 17, 1961

2,968,648

CURING AIR-BLOWN OILS WITH BLOCKED ISOCYANATES

Merilyn A. Tucker, Cranford, and Ober C. Slotterbeck, Clark Township, Union County, N.J., assignors to Esso Research and Engineering Company, a corporation of Delaware No Drawing. Filed Aug. 29, 1957, Ser. No. 681,126

7 Claims. (Cl. 260—77.5)

This invention relates to the curing of air blown hydrocarbon drying oils and relates more particularly to the curing of thick films of such oils with blocked isocyanates at ordinary or only slightly increased temperatures.

It is known to prepare films from liquid polymers of diolefins or copolymers of such diolefins with monomers copolymerizable therewith. These films have been cured by air drying or baking in an oven for about 30 minutes at 300°–350° F. However, it has not been possible to cure relatively thick films (more than 1.5 mils in thickness) of these oils with any degree of satisfaction.

Recently it has been found that reasonably thick films (1.5 to 3 mils) can be cured provided the oil is first oxidized to contain 10 to 20% oxygen by blowing with the air or oxygen at a temperature between 20° and 280° F. in the presence of a solvent. However, such oils even in the presence of a drier require at least 5 days to air dry.

In accordance with the present invention it has now been found that even thicker films can be cured (5 mils or thicker) in a very short time by contacting the blown oils with blocked isocyanates at room temperature or at slightly elevated temperature to give hard, chemically resistant coatings.

The synthetic oils to which the present invention are applicable are oily polymers of butadiene, isoprene, dimethylbutadiene, piperylene, methylpentadiene or other conjugated diolefins having 4 to 6 carbon atoms per molecule. Instead of polymerizing any of the aforesaid diolefins alone, they may be copolymerized in mixtures with each other or in admixtures with minor amounts of ethylenically unsaturated monomers copolymerizable therewith, e.g., with 5–40% styrene, styrenes having alkyl groups substituted on the ring such as paramethyl styrene, dimethyl styrene, diethyl styrene, acrylonitrile, methacrylonitrile, methyl acrylate, methyl methacrylate, vinyl isobutyl ether, methyl vinyl ketone, and isopropyl methyl ketone. Such synthetic oils may be advantageously prepared by mass polymerization, either in the presence of a hydrocarbon soluble peroxide catalyst, such as benzoyl peroxide or cumene hydroperoxide or in the presence of metallic sodium. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150° and 200° C. (Varsol), 3 parts of tertiary butyl hydroperoxide (60% pure) and 0.75 part of diisopropyl exanthogen disulfide are heated in a closed reactor at about 90° C. for 40 hours whereupon the residual pressure is released and the unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some tertiary butyl alcohol. This solution of polymer is then preferably fractionated to remove the dimer and usually adjusted to 50% nonvolatile matter content. The nonvolatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. Patent application, Serial No. 782,850, of Arundale et al., filed on October 29, 1947, now Patent No. 2,586,594, which described alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight run mineral spirits boiling between 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid, and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50–95% nonvolatile matter is obtained, the nonvolatile matter being a drying oil having a molecular weight below 10,000, preferably between about 2,000 to 5,000.

Again it will be understood that the described sodium polymerization method may be varied considerably as by omitting the styrene coreactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about —15° and 250° C., preferably between 60° and 200° C., e.g., butane, benzene, xylene, naphtha, cyclohexane, and the like. The diluents are usually used in amounts ranging from 50 to 500 parts per 100 parts of monomer. The reaction temperature may vary between about 40° C. and 100° C., preferably around 65° to 85° C. As a catalyst, 0.1 to 10 parts of dispersed metallic sodium is used per 100 parts of monomers, sodium particle sizes below 100 microns being particularly effective. A particularly effective process for the preparation of the synthetic oil used in this invention is that described and claimed in Serial No. 485,392 filed February 1, 1955, in the name of Stanley E. Jaros and Joseph F. Nelson, the subject matter of which is incorporated herein by reference. In this application, 50 to 100 parts of butadiene-1,3 and 0 to 50 parts of styrene are reacted continuously in a five-stage reactor in the presence of the catalysts, diluents, modifiers, etc., described above.

The blowing of the above polymeric drying oils with air or oxygen is best carried out in a solvent of moderate to good solvency, e.g., solvents or solvent mixtures having a Kauri Butanol value of at least 40. At least a substantial portion of aromatic solvent is generally needed to secure such a KB value, and such aromatic content is highly beneficial in promoting oxygen uptake during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low KB value solvents are generally useful, the oil can be dissolved in strong solvent(s) from the start, thereby eliminating low solvency solvents. The choice of solvents will, of course, depend on the oxygen content which is desired in the finished oil as well as on the formulations of the coating compositions which are to be made from the blown oil, and in the interest of economy it is generally desirable to use the cheapest solvent(s) which possess the needed attributes of Kauri Butanol value and compatibility with the various ingredients of the finished coating vehicle which is to be formulated.

Examples of suitable solvents include aromatic or mixtures of aromatic and aliphatic hydrocarbons boiling up to about 250° C. The aromatic solvent may be benzene, toluene, hemimellitene, pseudocumene, mesitylene, propyl benzene, cymene, ethyl toluene, methyl ethyl benzene, xylenes, Solvesso-100 (a mixture of aromatic hydrocarbons boiling from about 150° to 175° C.), Solvesso-150 (a mixture of aromatic hydrocarbons boiling from about 190° to 210° C.), or mixtures thereof. Other suitable solvents include the Varsols which are straight run mineral spirits boiling in the range of 140° to 205° C., having API gravities of 40 to 55 and varying in aromatic content from 5 to 35 wt. %.

Catalysts suitable for the oxidation reaction of this invention include organic salts of metals such as the naphthenates, octoates, and other hydrocarbon soluble metal salts of cobalt, lead, iron, and manganese. These catalysts are used in amounts ranging from 0.001% to 1.0%. Peroxides such as benzoyl peroxide and the like may be added to reduce the induction period.

It is understood that conditions of temperature and time of reaction, ratio of reactants, degree of dilution, presence or lack of solvents and the like will depend upon factors including the degree of oxidation desired and the nature of the starting polymer, therefore, it is not intended that the invention be limited by the specific conditions and examples herein set forth as it is intended to illustrate and not limit the invention.

The nature of the oxidized diolefin polymer depends largely upon the extent of oxidation which in turn depends on various factors including time of oxidation, temperature, presence or absence of catalysts, type of solvent, etc. In general, greater extent of oxidation results in a lower solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is completely soluble only in aromatic solvents indicating that the oxidation has proceeded to a high degree. The percent of oxygen in the product will vary according to the conditions from a trace to 20% or more. For the purposes of this invention the oxidized oil should contain at least 10% oxygen.

According to this invention, the oxidized oil is mixed with the blocked isocyanate and applied to the desired surface and allowed to stand until dry or baked from 10 to 30 minutes at 150–250° F. The amount of isocyanate used should be such that there will be present in the final composition between 0.0038 and 0.0304 equivalents of free-NCO per 5 g. of oxidized oil.

By "blocked" isocyanate is meant the reaction product of a compound containing a plurality of available isocyanate groups (normally the para-NCO group) and a compound containing a plurality of hydroxyl groups or other polyfunctional compound containing an active hydrogen. The resulting compound may be completely or only partially blocked, .ie., one or more or all the isocyanate groups may be reacted.

Polyisocyanates which have been found to be satisfactory for the purposes of this invention include aryl isocyanates, such as tolylene diisocyanate-2,4; 3,3′-bitolylene, 4,4′-diisocyanate; and diphenylmethane 4,4-diisocyanate, as well as alkyl isocyanates such as hexamethylene diisocyanate. The isocyanate should contain at least two isocyanate groups and may have as many as four such groups, although it is preferred to use di- and triisocyanates.

Suitable hydroxyl compounds include glycerol, trimethylolethane, trimethyl propane or higher homologs thereof and pentaerythritol. For example, 2,4 or 2,6-tolylene diisocyanate may be reacted with trimethylolpropane according to the following equation:

$$3C_6H_3.CH_3.(NCO)_2 + CH_3CH_2C(CH_2OH)_3 \rightarrow$$
$$CH_3CH_2C(CH_2O.CO.NH.C_6H_3.CH_3.NCO)_3$$

The reaction is not limited to the above compounds but is applicable to all types of isocyanates and polyols having the formula $R(NCO)_n$ and $R'(OH)_n$ where R and R′ are alkyl, aryl, and alkaryl groups and $n$ is an integer above 1.

The blocked isocyanates of this invention will cross link the above-described oxidized oils to provide extremely hard, chemically resistant films. Very thick films are easily cured in a short time. This effectively cuts down on the number of coats that need to be applied when a thick coating is desired. Thus the mixture may be applied at a temperature between 10 and 40° C. with a brush, spray, or other convenient means that will produce a film between about 0.25 and 5.0 mils thick and then air dried at room temperature or baked for 10 to 30 minutes at 150° to 250° F. The properties of the films obtained may be varied by varying the specific isocyanate used, by varying the concentration of the blocked isocyanate or by curing the film at a slightly elevated temperature. The coatings thus obtained may be used for pipelines, tank linings, wood finishes, glass laminates, pressed boards, impregnants, and other industrial finishes.

The following specific examples are presented to illustrate the advantages of the present invention. All quantities are expressed in this specification and claims on a weight basis unless stated otherwise.

*Example 1*

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; flash, 105° F.; boiling range, 150° to 200° C.; solvent power, 33–37 Kauri-Butanol value (reference scale: Benzene-100 K.B. value, n-heptane 25.4 K.B. value).
[2] Dispersed to a particle size of 10 to 50 microns by means of an Eppenbach homo-mixer.

The polymerization of this charge was carried out at 50° C. in 2-liter autoclave provided with a mechanical agitator. Complete conversion was obtained in 4.5 hours. The catalyst was destroyed and removed from the resulting crude product and essentially all of the solvent removed by stripping to give a product of essentially 100% N.V.M. The resulting product had a viscosity of 1.5 poise at 50% N.V.M. in Varsol solution and the nonvolatile portion thereof had an average molecular weight of about 3,000.

The polymer oil thus obtained was dissolved in Solvesso-150 (a substantially 100% aromatic hydrocarbon cut boiling 365°–415° F.) to make a 35% N.V.M. solution. It was then blown with air at about 230° F. until the oxygen content reached 16%. A similar oil containing 10% oxygen was also prepared.

*Example II*

A half-block isocyanate was prepared by the reaction of molar equivalents of trimethylolpropane and tolylene diisocyanate (80% 2,4 and 20% 2,6 tolylene diisocyanate) in ethyl acetate solution. Each 10 ml. of the reacted solution contained 0.038 of free NCO groups.

*Example III*

The oxidized polymer oils of Example I were blended with various concentrations of the blocked isocyanate of Example II and painted on steel panels and allowed to dry without a drier. A similar series of panels were baked 30 minutes at 200° F. The following data were obtained:

AIR-DRIED BLOCKED ISOCYANATE CURES [1]

| Concentration Equivalents of Free-NCO per 5 g. oxidized oil | Thickness (Mils) | Sward Hardness | | | |
|---|---|---|---|---|---|
| | | 1 Day | 3 Days | 4 Days | 7 Days |
| ~16% O₂: | | | | | |
| 0.0000 | ~3–4 | | Tacky | | |
| 0.0038 | 4.6 | | 6 | | |
| 0.0114 | 7.0 | | 12 | | |
| 0.0190 | 5.0 | 14 | | 28 | 32 |
| 0.0304 | 9.6 | | 26 | 30 | |
| 0.0570 | 10.0 | | Very Brittle (>40) | | |
| ~10% O₂: | | | | | |
| 0.0000 | 2.3 | | | Tacky | |
| 0.0190 | 5.8 | 8 | | 16 | 16 |

LOW TEMPERATURE BAKED BLOCKED ISOCYANATE CURES (Films baked 30 min. at 200° F.)

| ~16% O₂: | | | | | |
|---|---|---|---|---|---|
| 0.0000 | ~3–4 | | Tacky | | |
| 0.0038 | 4.3 | | 8 | | |
| 0.0114 | 7.3 | | 20 | | |
| 0.0190 | 4.6 | 34 | | 42 | 46 |
| 0.0304 | 7.4 | | 30 | | |
| 0.0570 | 7.5 | | Very Brittle (>40) | | |
| ~10% O₂: | | | | | |
| 0.0000 | ~3–4 | | Tacky | | |
| 0.0190 | 7.2 | 16 | | 18 | 22 |

[1] It normally takes 5 days for oxidized oils containing 10% oxygen (2–3 mil film) to air dry without benefit of drier.

These baked films have been found to be resistant to water (5 hours), grease (2 hours), soap (2 hours), 1% NaOH (1 hour), heptane and crude oil (~6 months).

The above examples show that oxidized polymer oils can be cured by blending with blocked isocyanates and air drying or baking to give thick, hard, chemically resistant films.

The nature and objects of the present invention having been thus fully set forth and specific examples of the same given, what is claimed as new and useful and desired to be secured by Letters Patent is:

We claim:

1. A coating composition comprising: (1) a liquid polymer drying oil chosen from the group consisting of homopolybutadiene and copolymers of butadiene and styrene containing 5 to 40% by weight of styrene and 60 to 95 wt. % of butadiene which polymer drying oil has been blown with air until the polymer contains at least 10% by weight of oxygen and (2) the reaction product of 1 mole of trimethylolpropane and 3 moles of 2,4-tolylene diisocyanate, the amount of said reaction product being such that between 0.0038 and 0.0304 equivalent of unreacted NCO groups in the 2,4-tolylene diisocyanate per 5 grams of oxidized oil is present.

2. A process for improving the hardness of films prepared from liquid polymer drying oils chosen from the group consisting of homopolybutadiene and copolymers of butadiene and styrene containing 5 to 40% by weight of styrene and 60 to 95 wt. percent of butadiene, which comprises first blowing the oil at a temperature between 20° and 280° F. with oxygen until at least about 10% by weight of oxygen has been incorporated into the oil, mixing the blown oil with the reaction product of 1 mole of trimethylolpropane and 3 moles of tolylene diisocyanate, the amount of said reaction product being such that between 0.0038 and 0.0304 equivalent of unreacted NCO groups in the 2,4-tolylene diisocyanate per 5 grams of blown oil are present, applying a film of said mixture to a base member and drying said film at a temperature between room temperature and 250° F.

3. A process according to claim 2 in which the liquid polymer drying oil is a copolymer of butadiene and styrene.

4. A process according to claim 3 in which the film is dried in air at room temperature.

5. A process according to claim 3 in which the film is dried by baking for 10 to 30 minutes at a temperature of 150° to 250° F.

6. A coating composition according to claim 1 in which the polymer drying oil has a molecular weight of at least 1,000.

7. A process according to claim 2 in which the molecular weight of the polymer drying oil is at least 1,000.

References Cited in the file of this patent

UNITED STATES PATENTS

| 2,417,792 | Verbanc | Mar. 18, 1947 |
| 2,674,586 | Welch | Apr. 6, 1954 |
| 2,792,382 | Edmonds | May 14, 1957 |

FOREIGN PATENTS

| 407,341 | Italy | Sept. 28, 1944 |
| 742,501 | Great Britain | Dec. 30, 1955 |
| 852,882 | Germany | Oct. 20, 1952 |
| 895,831 | Germany | Nov. 5, 1953 |

OTHER REFERENCES

De Bell et al.: German Plastics Practice, pages 300–304, publ. by De Bell & Richardson, Springfield, Mass. (1946).